United States Patent
Nayak et al.

(10) Patent No.: US 12,528,941 B2
(45) Date of Patent: Jan. 20, 2026

(54) POLYMERIC COMPOSITIONS AND CORROSION RESISTANT SYSTEMS

(71) Applicant: University of Rhode Island Board of Trustees, Kingston, RI (US)

(72) Inventors: Sumeru Nayak, Kingston, RI (US); Sumanta Das, Kingston, RI (US)

(73) Assignee: University of Rhode Island Board of Trustees, Kingston, RI (US)

(*) Notice: Subject to any disclaimer, the term of this patent is extended or adjusted under 35 U.S.C. 154(b) by 891 days.

(21) Appl. No.: 17/588,674

(22) Filed: Jan. 31, 2022

(65) Prior Publication Data
US 2022/0259433 A1 Aug. 18, 2022

Related U.S. Application Data

(60) Provisional application No. 63/150,104, filed on Feb. 17, 2021.

(51) Int. Cl.
 *C08L 9/00* (2006.01)
 *C08K 3/04* (2006.01)
 (Continued)

(52) U.S. Cl.
 CPC ........... *C08L 91/00* (2013.01); *C08K 3/04* (2013.01); *C09D 5/103* (2013.01); *C09D 5/106* (2013.01);
 (Continued)

(58) Field of Classification Search
 CPC .......... C09D 5/10; C09D 5/103; C09D 5/106; C09D 7/06; C09D 191/00; C08K 3/04;
 (Continued)

(56) References Cited

U.S. PATENT DOCUMENTS 4,307,001 A * 12/1981 Strazik .................. C08G 12/42
 525/157
4,727,100 A * 2/1988 Vasta ................. C08G 18/3262
 528/282
(Continued)

FOREIGN PATENT DOCUMENTS

CN 112143354 A * 12/2020 ............... C09D 7/65

OTHER PUBLICATIONS

Chemical Composition of Steel, Sep. 28, 2017, Bailey metal processing limited.*
(Continued)

*Primary Examiner* — Jun Li
(74) *Attorney, Agent, or Firm* — Hinckley Allen & Snyder; Stephen Holmes

(57) ABSTRACT

A composition and method of synthesizing a composition from organic oils and industrial byproducts for use as a corrosion inhibitor coating is disclosed. The synthesis of a rapid setting ionomer is the result of iron-induced polymerization of oleic and linoleic acids, where an alkaline ionomeric reaction is facilitated with a small fraction of pure aluminum leaf at room temperature. At least one alkaline reagent is employed with at least one metallic additive to form metal complex ionomers that form a solid polymer. The resulting ionomer is stirred and applied on the substrate as a surface coating and it starts setting in less than thirty minutes.

6 Claims, 2 Drawing Sheets

(51) Int. Cl.
*C08L 91/00* (2006.01)
*C09D 5/10* (2006.01)
*C09D 7/61* (2018.01)
*C09D 191/00* (2006.01)
*C08K 3/08* (2006.01)

(52) U.S. Cl.
CPC ............. *C09D 7/61* (2018.01); *C09D 191/00* (2013.01); *C08K 2003/0812* (2013.01); *C08K 2003/0893* (2013.01)

(58) Field of Classification Search
CPC .... C08K 2003/0812; C08K 2003/0893; C08L 91/00
See application file for complete search history.

(56) References Cited

U.S. PATENT DOCUMENTS

| 8,071,715 | B2 | 12/2011 | Hurd et al. |
| 8,409,340 | B1 | 4/2013 | Kharshan et al. |
| 10,392,711 | B2 | 8/2019 | Alkhaldi et al. |
| 2012/0288404 | A1* | 11/2012 | Yang ..................... C23F 11/173 422/7 |
| 2015/0267057 | A1* | 9/2015 | Berube ................... C03C 17/32 252/514 |
| 2016/0153107 | A1* | 6/2016 | Nemoto ............... C09D 163/00 428/418 |
| 2018/0298209 | A1* | 10/2018 | Elsbernd ................. C09D 7/00 |
| 2020/0181429 | A1* | 6/2020 | Wu ...................... C09D 163/00 |

OTHER PUBLICATIONS

Stone, David A. et al., "Synthesis and Characterization of an Iron-Containing Fatty Acid-Based Ionomer," Hindawi, International Journal of Polymer Science, vol. 2019, Article ID3024784, 9 pages—https://doi.org/10.1155/2019/3024784.

* cited by examiner

POLYMERIC COMPOSITIONS AND CORROSION RESISTANT SYSTEMS

CROSS-REFERENCE TO RELATED APPLICATIONS

The present application claims the benefit of U.S. Provisional Patent Application No. 63/150,104, filed Feb. 17, 2021, the entire contents of which are incorporated herein by reference.

BACKGROUND OF THE INVENTION

The present disclosure relates generally to polymeric compositions for corrosion protection systems and coatings. More specifically, the present disclosure relates to a polymer composition and method of synthesizing a polymer composition from waste organic oils and metal industrial byproducts for use as a corrosion inhibitor coating.

Concrete is a commonly used construction material due to its significant structural compressive strength. To enhance a concrete structure's strength for applications under tension or torsion, reinforcing steel rods, also known as "rebar", will be imbedded into the concrete as it is poured. Since concrete structures are typically used for large outdoor projects, such as bridges and roadways for example, the structures are frequently exposed to harsh environmental conditions. Bridges and roadways are also frequently treated with corrosive materials, such as salt, to prevent icing. The harsh environmental conditions and treatment with corrosive materials results in corrosion of the rebar contained within the concrete. This corrosion causes the rebar to expand in diameter which in turn exerts pressure on the surrounding concrete and ultimately results in cracking and spalling of the concrete. Such corrosion of rebar in concrete structures can potentially lead to catastrophic damage and sudden collapse.

The most widely used corrosion control techniques are either active corrosion monitoring which requires constant monitoring, or passive monitoring which is generally applicable on a larger scale. Alternately, coated rebar or concrete additives can also serve to inhibit corrosion, albeit at higher costs and/or degraded material performance. The most widely used passive techniques involve the application of metallic or organic coatings to the rebar. Production of such metallic coatings requires high energy inputs thus indirectly contributing to global greenhouse gas emissions. Organic coatings, typically polymeric in nature, are derived from petroleum sources and while they are significantly cheaper to produce, they suffer from durability issues. Several nonconventional means of developing novel and sustainable coating materials for large-scale infrastructure applications using renewable, agriculturally sourced materials are ongoing.

There is ongoing research into the synthesis of polymers from agriculturally sourced oils and fats. Some examples are the heat-induced polymerization of oils, cationic polymerization and polymer formation after the pericyclic reaction of a triglyceride with a selected amine. In addition, it is known that an acrylate can be grafted onto a triglyceride and subsequently polymerized. The triglyceride can also be modified to bear a hydroxy group, which is then reacted with di-isocyanates to form a polyurethane. Also, the double bonds in triglycerides can be converted into epoxy groups, which can then be polymerized. Finally, other efforts have been made to polymerize epoxidized fatty acid methyl ester.

BRIEF SUMMARY OF THE INVENTION

Most of the prior art research in this area generally involves triglycerides or their methyl esters and thus far, there has been relatively little effort in converting free fatty acids into polymers. Further there have been relatively few attempts at the use of waste iron powder and tall oil fatty acid with trace metallic additives to yield a solid polymer in the presence of carbon dioxide.

Sustainable, agriculturally sourced materials can provide multiple benefits through easy regeneration, biodegradability and trapping of $CO_2$ emitted from industrial operations. For example, the utilization of a waste material, such as iron powder, that is otherwise land-filled, can be used to produce organo-metallic materials. The use of waste iron powder can, in turn, be used for iron-induced polymerization of waste fatty acids sourced from the paper industry (a 50-48% combination of oleic and linoleic acids) as a suitable candidate for formation of biodegradable polymeric systems. In the presence of carbon dioxide, the tall oil fatty acids form a viscous ionomer.

However, one of the major drawbacks to the use of an ionomer synthesized from iron-induced polymerization of oleic and linoleic acids is that the resulting polymeric material exhibits unreasonably long curing times. The viscous ionomer undergoes slow curing in standard atmospheric pressure and temperature. Even under application of high temperatures, the cure time of the ionomer is not shortened significantly and can lead to loss of material. For example, exposure to sunlight cures the viscous polymer in months. This poses a challenge in its applicability in coatings where the uncured polymeric material can flow under gravity. From a large-scale application perspective, this delayed curing involves impractical manufacturing techniques that can require months owing to delayed curing. Additionally, the viscosity of the uncured polymer needs to be controlled to ensure its workability, performance, and shorter setting times. As a result, there needs to be a solution in the form of a suitable chemical reaction to cure the polymer and reduce its setting time, so as to enhance its applicability as a surface coating.

There is therefore a need for a composition and method of synthesizing a composition from organic oils and metallic industrial byproducts for use as a corrosion inhibitor coating. There is also a need for a composition and method of synthesizing a composition from various manufacturing byproducts and renewable materials that operates as a corrosion inhibitor coating. Further, there is a need for a composition and method of synthesizing a composition from various manufacturing byproducts and renewable materials that operates as a corrosion inhibitor coating that exhibits improved curing times and improved coating performance as compared to the materials presently known in the art.

In this regard, the present disclosure provides for a polymeric composition and method of synthesizing a polymeric composition from organic oils and industrial byproducts for use as a corrosion inhibitor coating. As such, the general purpose of the present disclosure, which will be described subsequently in greater detail, is to provide for the synthesis of a rapid setting ionomer resulting from iron-induced polymerization of oleic and linoleic acids, where an alkaline ionomeric reaction is facilitated with a small fraction of pure aluminum leaf at room temperature. The resulting ionomer is stirred and applied on the substrate as a surface coating where it starts setting (curing) in less than 30 minutes.

Exemplary embodiments of polymer compositions in accordance with the teachings of the present invention include an ionomer precursor composition comprising waste iron powder, waste fatty acids from Kraft paper manufacturing comprising oleic and linoleic acids, a second additive comprising carbon dioxide, a third metallic additive, such as aluminum for example, and a fourth alkaline additive, such as sodium hydroxide, by way of example.

In some exemplary embodiments of the invention, the precursor composition comprises carbonic acid as an additive. In some further embodiments, at least one liquid acid comprises oleic and linoleic acids. In some exemplary embodiments, the first liquid precursor is derived from agricultural sources. In still further exemplary embodiments, the precursor composition comprises at least one alkaline reagent. Some embodiments include an inorganic reagent that may comprise sodium aluminate.

In some embodiments of the invention, the metallic additives include waste iron powder from EAF steel plants. In some further embodiments, the metallic additives include iron and aluminum. In still further embodiments, the metallic additives comprise or are derived from iron and aluminum. In some embodiments of the invention, the powdered iron or steel originates or is derived from a by-product of one or more industrial processes. In some further embodiments, the iron powder has a median particle size of 19 μm. In some further embodiments of the invention, the aluminum additive has a leaf-like dimension of 0.02 mm thickness.

In one particular exemplary embodiment of the invention, the base coat of the polymeric composition can be brought about by the conversion of the iron from the substrate to the ionomer formed by conjugation of oleic and linoleic fatty acids abetted by the presence of carbon dioxide. In some further embodiments of the invention, the carbon dioxide can be supplied in carbonated water or carbon dioxide can be bubbled into such a mixture. In some further embodiments of the invention, the metal carboxylates thus formed help in the formation of the base coat.

Further opportunities exist in terms of improving the corrosion resistance of the surface coating by the incorporation of metallic particles like zinc, magnesium, or chromium. Such metallic components can participate in ionomer formation or act as a filler that can serve as sacrificial sites for corrosion protection. Such techniques can resist atmospheric corrosion as well.

Accordingly, the present disclosure provides a composition and method of synthesizing a composition from organic oils and industrial byproducts for use as a corrosion inhibitor coating. Further provided is a composition and method of synthesizing a composition from various manufacturing byproducts and renewable materials that operates as a corrosion inhibitor coating. Still further, the present disclosure provides a composition and method of synthesizing a composition from various manufacturing byproducts and renewable materials that operates as a corrosion inhibitor coating that exhibits improved curing times and improved coating performance as compared to the materials presently known in the art.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
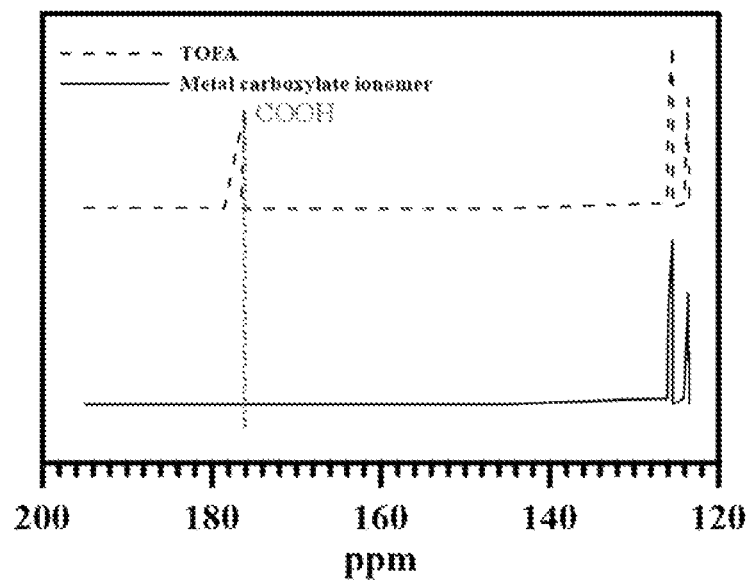
FIG. 1 depicts a comparison of the Carbon-13 nuclear magnetic resonance (13C NMR) spectra of tall oil fatty acids and a metal carboxylate ionomer formed in the presence of carbon dioxide (the carboxylate formation is indicated by the lack of COOH peak in the product) in accordance with some embodiments of the invention.

Prior to a detailed discussion of the embodiments of the invention, it is to be understood that the present disclosure and invention are not limited in its application to the details of construction and the arrangement of components set forth in the following description or illustrated in the following drawings. The invention is capable of other embodiments, and of being practiced or of being carried out in various ways.

It is also to be understood that the phraseology and terminology used herein is for the purpose of description and should not be regarded as limiting. The use of "including." "comprising," or "having and variations thereof herein is meant to encompass the items listed thereafter and equivalents thereof as well as additional items. Unless specified or limited otherwise, the terms "mounted," "connected," "supported, and "coupled and variations thereof are used broadly and encompass both direct and indirect mountings, connections, supports, and couplings. Further, "connected and "coupled are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

In this regard, the present disclosure provides for a rapid curing polymeric composition and method of synthesizing a rapid curing polymeric composition from organic oils and metallic industrial byproducts for use as a corrosion inhibitor coating. As such, the disclosure provides for the synthesis of a rapid setting (curing) ionomer resulting from iron-induced polymerization of oleic and linoleic acids, where an alkaline ionomeric reaction is facilitated with a small fraction of pure aluminum leaf at room temperature. The resulting ionomer is stirred and applied on the substrate as a surface coating and it starts setting (curing) in less than 30 minutes.

Some embodiments of the invention include an ionomer precursor composition comprising waste iron powder, waste fatty acids from Kraft paper manufacturing comprising oleic and linoleic acids, a second additive comprising carbon dioxide, a third metallic additive, such as aluminum for example, and a fourth alkaline additive, such as sodium hydroxide, sodium aluminate or aluminum hydroxide, by way of example.

In some embodiments of the invention, the precursor composition comprises carbonic acid as an additive. In some further embodiments, at least one liquid acid comprises oleic and linoleic acids. In some embodiments of the invention, the first liquid precursor may be derived from agricultural sources. In some further embodiments, the precursor composition comprises at least one alkaline reagent. Some embodiments include an inorganic reagent that comprises sodium aluminate.

In some embodiments of the invention, the metallic additives include waste iron powder from EAF steel plants. In some further embodiments, the metallic additives include iron and aluminum. In still further embodiments, the metallic additives comprise or are derived from iron and aluminum. In some embodiments of the invention, the powdered iron or steel originates or is derived from a by-product of one or more industrial processes. In some further embodiments, the iron powder has a median particle size of 19 μm. A median particle range of 1 μm to 150 μm is contemplated. In some further embodiments of the invention, the aluminum additive has a leaf-like dimension of 0.02 mm thickness. A thickness range of 0.016 mm to 0.024 mm is contemplated.

In one exemplary embodiment of the invention, the base coat of the corrosion protection system can be brought about by the conversion of the iron from the substrate to the ionomer formed by conjugation of oleic and linoleic fatty acids abetted by the presence of carbon dioxide. In some further embodiments of the invention, the carbon dioxide can be supplied in the carbonated water or carbon dioxide can be bubbled into the liquid fatty acid mixture. In some further embodiments of the invention, the metal carboxylates thus formed help in the formation of the base coat.

In some embodiments of the invention, tall oil fatty acids (TOFA), which are inexpensive and abundantly available, are a by-product of the Kraft paper making process. In some embodiments of the invention, TOFA comprises approximately 48% oleic acid, 46% linoleic acid and isomers, 3% palmitic and stearic acids, and 3% other fatty acids. The combined volume fraction of conjugated and non-conjugated linoleic acids ranges from 44 to 48%. A volume fraction by 2-3% of resin acid (primarily abietic acids) and 1-2% of unsaponifiable oil is generally present in the TOFA. An oleic acid volume fraction of 46-50% is contemplated.

In some embodiments of the invention, a mixture of TOFA, metallic iron, carbon dioxide, trace water, aluminum, and an alkyd solution, such as sodium hydroxide solution is transformed into a solid polymer. In some further embodiments of the invention, similar reactions can be carried out with fatty acids derived from soybean oil, cottonseed oil, and other plant oils. In some further embodiments of the invention, the applications of such novel systems act as carbon traps and are biodegradable, thus ensuring sustainable infrastructure materials.

In some embodiments of the invention, varying concentrations of carbon dioxide and TOFA were used. In some further embodiments of the invention, the carbon dioxide can be supplied in a chamber enclosing it or in the form of carbonated water. In some further embodiments of the invention, the TOFA:iron powder concentrations ranging from 1:0.5 to 1:1 while carbon dioxide concentrations were 0.0025 parts per volume. In some further embodiments of the invention, the mixtures were heated at 35-45° C. resulting in bubbling, and the mixture thickened in an hour resulting in a dark viscous polymer.

As depicted in FIG. 1, in some embodiments of the invention, the comparative Carbon-13 Nuclear Magnetic Resonance (13C NMR) spectra of the TOFA and the metal carboxylate ionomer formed in the presence of carbon dioxide shows the carboxylate formation which is identified by the lack of COOH peak in the product.

In some embodiments of the invention, aluminum and sodium hydroxide powder are mixed into water at a ratio varying from 0.0058:0.278:1 to 0.0072:0.325:1 by weight. The mixture is stirred and added to the viscous polymer to result in a darker cured solid polymer. In some further embodiments of the invention, the polymer, which is a result of Diels-Adler coupling followed by ionomer formation, is applied as a coating on the steel rebar.

Figure 2:
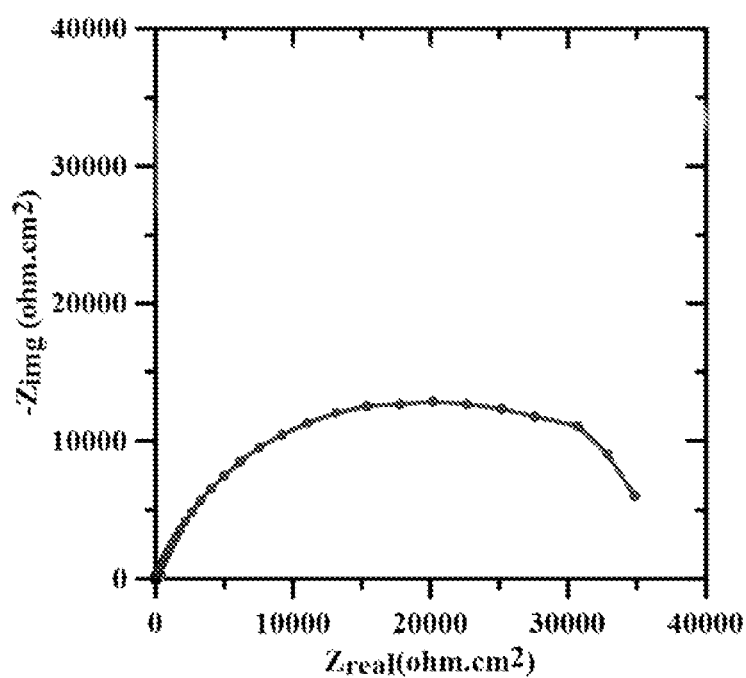
FIG. 2 shows the Electrochemical Impedance Spectroscopy (EIS) results of rebar coated in accordance with the present disclosure in 3.5 wt % NaCl solution.
Figure 2A:
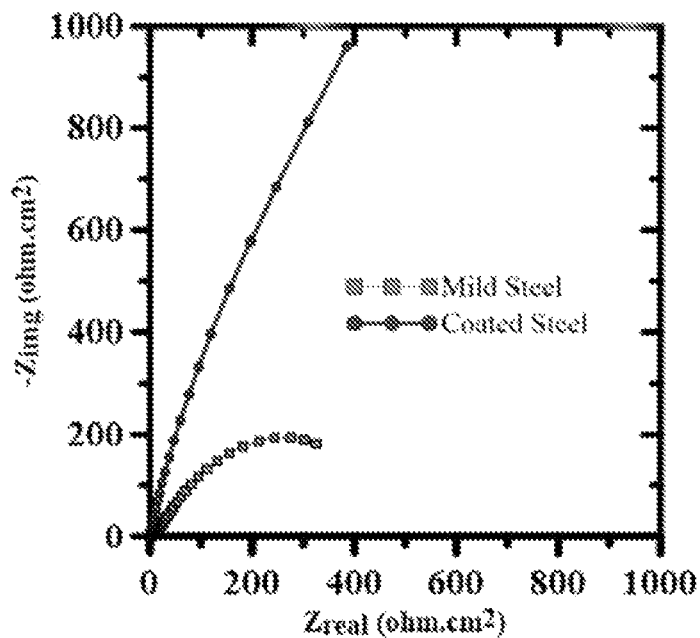
FIG. 2A shows a EIS Nyquist plot for impedance in coated steel contrasted with bare steel (see inset) in accordance with some embodiments of the invention.

The surface coatings resulting from a polymeric composition disclosed herein are evaluated for their electrochemical performance by Electrochemical Impedance Spectroscopy (EIS) whereby an alternating current (AC) current with low amplitude and continuously varying frequency is impressed to elicit the AC impedance and phase-shift which can be fitted to an Equivalent Circuit (EQC) consisting of ohmic, capacitive, and constant phase elements (constant phase elements). In some further embodiments of the invention, a Solartron™ 1260 gain phase analyzer equipped with ZView software operating in the 1 Hz to 1 MHz frequency range was used with a 250 mV AC signal reading five measurements in every decade of frequency at 25° C. so as to obtain the coating performance in 3.5 wt % NaCl solution (shown in FIG. 2). In some further embodiments of the invention, the significant difference in the impedance values (see FIG. 2A) serve to illustrate the corrosion protection of the coated system as compared to bare steel under high chloride loadings, as can be expected in severely cracked marine concrete structures.

Figure 2B:
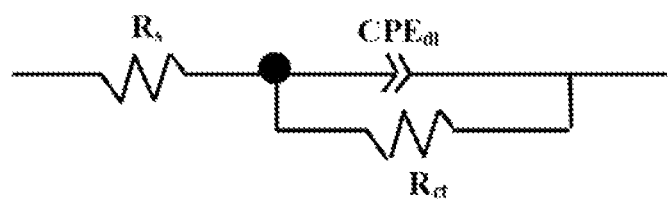
FIG. 2B shows the Equivalent Circuit (EQC) for bare steel.
Figure 2C:
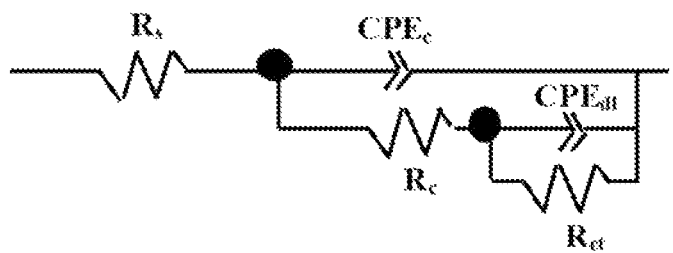
FIG. 2C shows the equivalent EQC for steel coated in accordance with some embodiments of the invention.

In some embodiments of the invention, the EQC for coated steel (shown in FIG. 2C) has coating resistance $R_c$ of 3.7 kΩ·cm$^2$, charge transfer resistance $R_{ct}$ of 39.2 kΩ·cm$^2$, as contrasted with EQC for bare steel (shown in FIG. 2B) with a low charge transfer resistance $R_{ct}$ of 0.62 kΩ·cm$^2$. The significantly higher charge transfer resistance of the coated system translates to a greater energy required to transfer electrons from the system to the electrolyte thus rendering corrosion infeasible, thereby elucidating the efficacy of its corrosion resistance.

Further, the corrosion resistance of the surface coating can be improved by the incorporation of other metallic particles like zinc, magnesium, or chromium. Such metallic components can participate in ionomer formation or act as a filler that can serve as sacrificial sites for corrosion protection. Such techniques improve resistance to atmospheric corrosion as well.

It can therefore be seen that the present disclosure provides a composition and method of synthesizing a composition from organic oils and industrial byproducts for use as a corrosion inhibitor. Further, the present disclosure provides a composition and method of synthesizing a composition from various manufacturing byproducts and renewable materials that operates as a corrosion inhibitor coating. Still further, the present disclosure provides a composition and method of synthesizing a composition from various manufacturing byproducts and renewable materials that operates as a corrosion inhibitor coating that exhibits improved curing times and improved coating performance as compared to the materials presently known in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims

What is claimed:

1. A polymeric precursor composition, comprising:
   at least one tall oil fatty acid;
   a powdered iron material;
   at least one metallic additive selected from the group consisting of: aluminum, zinc, magnesium and chromium;
   at least one alkaline reagent selected from the group consisting of: sodium hydroxide, sodium aluminate and aluminum hydroxide; and
   carbon dioxide,
   wherein said at least one tall oil fatty acid, said powdered iron material, said at least one metallic additive, said at least one alkaline reagent and said carbon dioxide are blended to form said polymeric precursor composition, and
   wherein said at least one metallic additive and said at least one alkaline reagent are mixed in water at a ratio of 0.0058 to 0.325 to 1, by weight, prior to blending with said tall oil fatty acids.

2. The polymeric precursor composition of claim 1, wherein said at least one tall oil fatty acid is selected from the group consisting of oleic acid and linoleic acid.

3. The polymeric precursor composition of claim 1 wherein said at least one metallic additive and said at least one alkaline reagent are mixed in water at a ratio of 0.0072 to 0.278 to 1, by weight, prior to blending with said tall oil fatty acids.

4. A polymeric precursor composition, comprising:
   a blend of tall oil fatty acids;
   a powdered iron material;
   at least one metallic additive selected from the group consisting of: aluminum, zinc, magnesium and chromium;
   at least one alkaline reagent selected from the group consisting of: sodium hydroxide, sodium aluminate and aluminum hydroxide; and
   carbon dioxide,
   wherein said blend of tall oil fatty acids, said powdered iron material, said at least one metallic additive, said at least one alkaline reagent and said carbon dioxide are blended to form said polymeric precursor composition, and
   wherein said at least one metallic additive and said at least one alkaline reagent are mixed in water at a ratio of 0.0058 to 0.325 to 1, by weight, prior to blending with said tall oil fatty acids.

5. The polymeric precursor composition of claim 4 wherein said blend of tall oil fatty acids comprises oleic acids and linoleic acids.

6. The polymeric precursor composition of claim 4 wherein said metallic additive and said alkaline reagent are mixed in water at a ratio of 0.0072 to 0.278 to 1, by weight, prior to blending with said blend of tall oil fatty acids.

* * * * *